(12) United States Patent
Walker

(10) Patent No.: US 9,627,772 B2
(45) Date of Patent: Apr. 18, 2017

(54) PASSIVE REPEATER FOR WIRELESS COMMUNICATIONS

(71) Applicant: Michael Clyde Walker, Coronado, CA (US)

(72) Inventor: Michael Clyde Walker, Coronado, CA (US)

( * ) Notice: Subject to any disclaimer, the term of this patent is extended or adjusted under 35 U.S.C. 154(b) by 176 days.

(21) Appl. No.: 14/162,357

(22) Filed: Jan. 23, 2014

(65) Prior Publication Data

US 2014/0198008 A1    Jul. 17, 2014

Related U.S. Application Data

(63) Continuation of application No. 13/856,250, filed on Apr. 3, 2013, now abandoned, which is a continuation
(Continued)

(51) Int. Cl.
*H01Q 19/10*    (2006.01)
*H01Q 25/00*    (2006.01)
(Continued)

(52) U.S. Cl.
CPC .............. *H01Q 19/06* (2013.01); *H01Q 9/16* (2013.01); *H01Q 19/10* (2013.01);
(Continued)

(58) Field of Classification Search
CPC  H01Q 5/48; H01Q 5/49; H01Q 19/22; H01Q 19/28; H01Q 19/30; H01Q 25/005; H01Q 25/00; H01Q 9/26; H01Q 9/265; H01Q 9/27; H01Q 1/2208; H01Q 1/2216; H01Q 1/2225; H01Q 1/2233; H01Q 1/2241; H01Q 1/32; H01Q 1/3208; H01Q 1/3216; H01Q 1/325; H01Q 1/3275; H01Q 1/3291;
(Continued)

(56) References Cited

U.S. PATENT DOCUMENTS

| | | | |
|---|---|---|---|
| 3,372,572 A | | 3/1968 | Kuo |
| 3,531,805 A | * | 9/1970 | Winegard ............ H01Q 1/1228 343/727 |

(Continued)

FOREIGN PATENT DOCUMENTS

WO    WO 2014/210519    6/2014

*Primary Examiner* — Tho G Phan
*Assistant Examiner* — Patrick Holecek
(74) *Attorney, Agent, or Firm* — IDP Patent Services; Olav M. Underdal

(57) ABSTRACT

Some embodiments provide a relatively small antenna apparatus that acts as a passive repeater. The antenna apparatus can be designed to facilitate radio frequency (RF) signal gain for a collection or range of frequencies. In some embodiments, the antenna apparatus is placed near a device with a wireless receiver and/or transmitter, where the antenna apparatus causes increased RF signal intensity at the device by coupling RF signals from a proximate area of higher RF signal intensity into the area around the device. Accordingly, in some instances, an embodiment of the antenna apparatus can be used to increase the RF signal intensity in a null spot or dead spot by coupling RF signal energy from an area proximate to the null spot that has higher RF signal intensity.

23 Claims, 10 Drawing Sheets

Related U.S. Application Data of application No. 12/884,056, filed on Sep. 16, 2010, now abandoned.

(60) Provisional application No. 61/243,120, filed on Sep. 16, 2009, provisional application No. 61/373,222, filed on Aug. 12, 2010.

(51) Int. Cl.
  *H01Q 19/06* (2006.01)
  *H01Q 9/16* (2006.01)
  *H01Q 19/30* (2006.01)

(52) U.S. Cl.
  CPC ........... *H01Q 19/108* (2013.01); *H01Q 19/30* (2013.01); *H01Q 25/005* (2013.01)

(58) Field of Classification Search
  CPC ........ H01Q 1/521; H01Q 1/523; H01Q 1/525; H01Q 7/00; H01Q 7/005
  See application file for complete search history.

(56) References Cited

U.S. PATENT DOCUMENTS

| | | | |
|---|---|---|---|
| 3,732,572 A * | 5/1973 | Kuo | H01Q 13/206 343/792.5 |
| 4,001,834 A | 1/1977 | Smith | |
| 4,899,164 A * | 2/1990 | McGrath | H01Q 21/0018 343/700 MS |
| 5,164,738 A | 11/1992 | Walter et al. | |
| 5,181,043 A | 1/1993 | Cooper | |
| 5,414,438 A | 5/1995 | Dooley | |
| 6,057,803 A * | 5/2000 | Kane | H01Q 1/32 343/713 |
| 6,341,217 B1 | 1/2002 | Wong | |
| 6,563,425 B2 | 5/2003 | Nicholson et al. | |
| 6,563,465 B2 | 5/2003 | Frecska | |
| 6,615,026 B1 | 9/2003 | Wong | |
| 6,934,511 B1 | 8/2005 | Lovinggood et al. | |
| 6,987,485 B2 * | 1/2006 | Ito | H01Q 1/243 343/702 |
| 7,002,523 B2 | 2/2006 | Noro | |
| 7,065,350 B2 | 6/2006 | Capobianco et al. | |
| 7,071,886 B2 | 7/2006 | Doi et al. | |
| 7,088,303 B1 | 8/2006 | Lackey et al. | |
| 7,146,131 B2 | 12/2006 | Moon | |
| 7,429,953 B2 * | 9/2008 | Buris | H01Q 1/007 343/700 MS |
| 7,577,398 B2 | 8/2009 | Judd et al. | |
| 7,629,943 B2 * | 12/2009 | Tuttle | H01Q 21/00 343/872 |
| 7,696,940 B1 * | 4/2010 | MacDonald | H01Q 3/18 343/724 |
| 7,750,855 B2 | 7/2010 | Wong | |
| 7,888,630 B2 | 2/2011 | Wong | |
| 8,208,980 B2 | 6/2012 | Wong et al. | |
| 8,214,003 B2 | 7/2012 | Wong et al. | |
| 8,223,084 B2 * | 7/2012 | Tani | H01Q 1/243 343/803 |
| 8,232,920 B2 * | 7/2012 | Ding | H01Q 1/2283 343/700 MS |
| 8,298,318 B2 | 10/2012 | Wong | |
| 8,442,602 B2 | 5/2013 | Wong et al. | |
| 8,750,948 B2 | 6/2014 | Wong et al. | |
| 8,897,843 B2 | 11/2014 | Wong et al. | |
| 2007/0152903 A1 * | 7/2007 | Lin | H01Q 3/242 343/795 |
| 2007/0205946 A1 | 9/2007 | Buris et al. | |
| 2008/0001497 A1 | 1/2008 | Wong et al. | |

\* cited by examiner

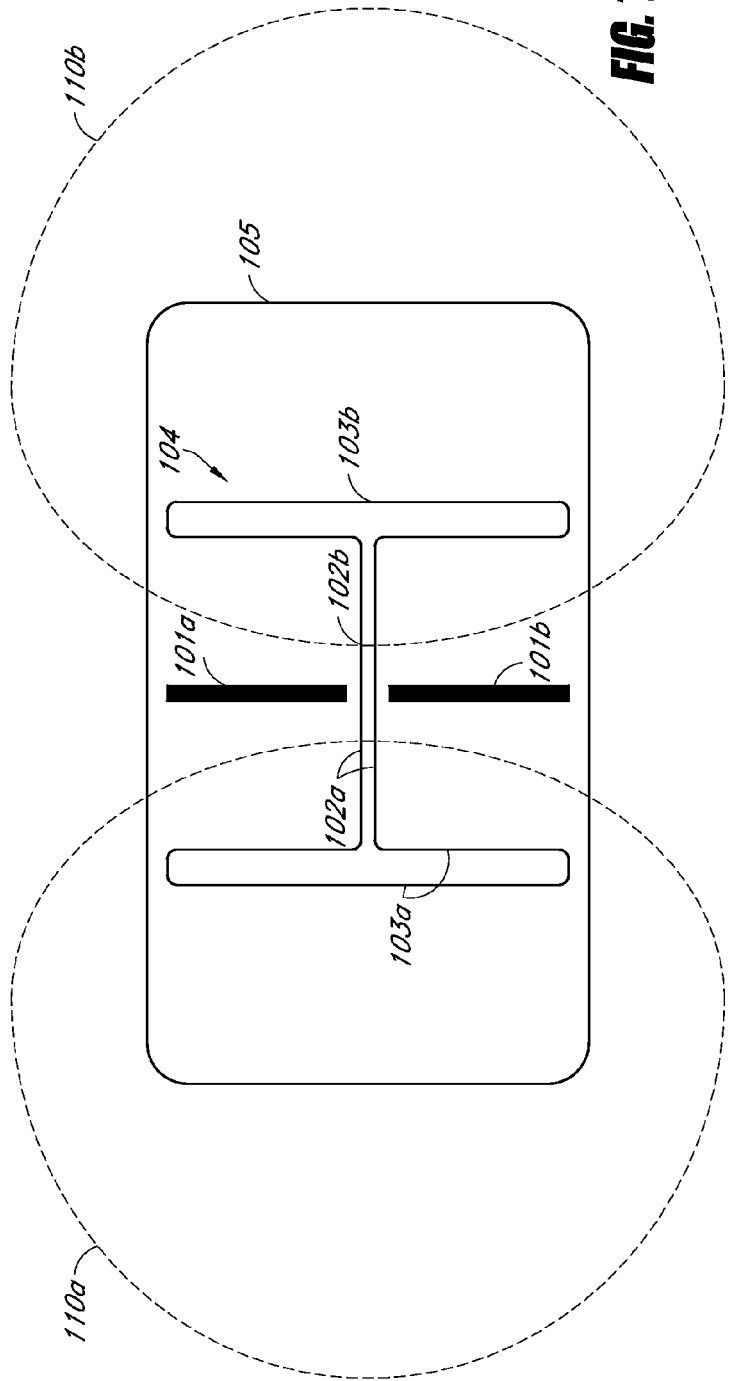
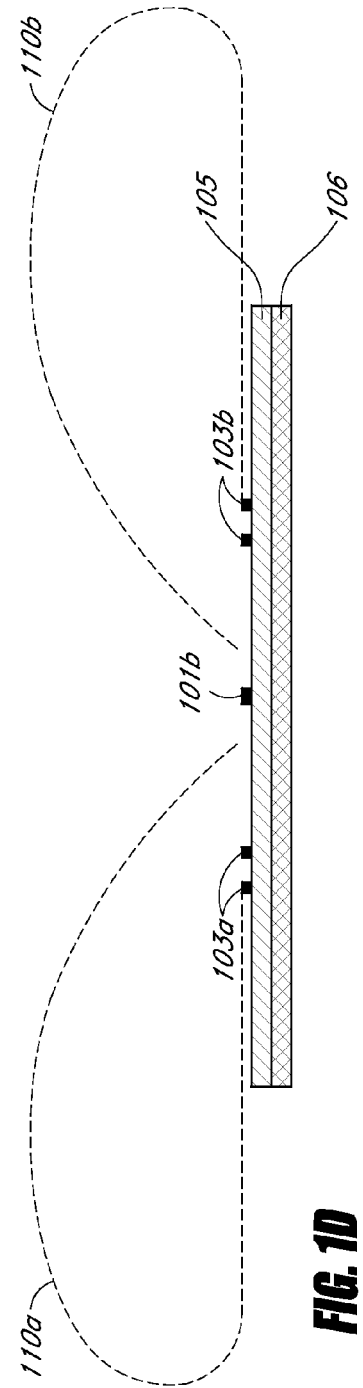

PASSIVE REPEATER FOR WIRELESS COMMUNICATIONS

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Field

This disclosure relates to wireless communications and to passive repeaters for wireless communications.

Description of Related Art

Growing demand for high-rate wireless data services continues to drive the growth of wireless networks. One factor fostering the rapid growth of wireless networks is the growing demand for high-rate data services to be accessible from virtually any location, at all times.

However, despite the efforts of network operators and consumer equipment makers to provide seamless wireless communication coverage, areas of weak signal strength still exist, even in richly serviced areas such as urban centers. The areas of weak signal strength, sometimes referred to as null spots or dead spots, are sometimes caused by the density and material composition of vehicles, buildings and other structures in a wireless coverage area. For example, within a substantially enclosed environment, such as a vehicle or building, the materials of the vehicle or building can cause shadowing, shielding and/or multipath interference that deteriorate radio frequency (RF) signals.

In a vehicle or building, for example, the metal body and/or frame of a vehicle or structural metal and/or reflective windows of a building creates a shielding effect that attenuates radio signals within the vehicle or building. In a dense urban area, the surrounding buildings create a multipath environment where signal reflections destructively combine in locations that are difficult to predict. The destructive interference reduces receivable RF signals to the point where wireless communication can be virtually impossible at the frequency and power levels used in the wireless system. In other situations, the structures themselves acts as barriers that significantly attenuate signal strength of RF signals to the point where the RF signal strength within the structure is lower than is desirable for reliable service.

SUMMARY

Various embodiments of systems, methods and devices within the scope of the appended claims have several aspects, no single one of which is solely responsible for the desirable attributes described herein. Without limiting the scope of the appended claims, some features are described. After considering this discussion, and particularly after reading the section entitled "Detailed Description," one will understand how the features of various embodiments are used to configure a passive antenna repeater.

There lies a challenge to provide increased RF signal strength within and around vehicles, buildings and/or other structures, so that wireless data services can be accessed seamlessly throughout a coverage area.

In some embodiments, an antenna apparatus includes an electromagnetically reflective layer plane, the electromagnetically reflective layer having first and second faces; a first dielectric layer disposed on the first face of the electromagnetically reflective layer; and a first arrangement of conductors disposed on the first dielectric layer. The first arrangement of conductors can include a first resonator including a first antenna having a respective feed point, a second antenna having a respective feed point, and a first coupling element electrically connecting the respective feed points of the first and second antennas. The first arrangement of conductors can include a first reflector electrically isolated from the first resonator and positioned adjacent to at least one of the first and second antennas. The longitudinal axis of the first reflector can intersect the first coupling element.

In some embodiments, the first and second antennas are folded dipole antennas. The respective feed point for each of the first and second antennas comprises first and second feed terminals. Additionally, the coupling element includes first and second conductive traces, the first conductive trace electrically connecting the respective first feed terminals of the first and second antennas, and the second conductive trace electrically connecting the respective second feed terminals of the first and second antennas. In some embodiments, at least one of the first and second antennas includes an undulating portion.

In some embodiments, the first arrangement of conductors also includes a second reflector electrically isolated from the first resonator and positioned adjacent to the second antenna. The longitudinal axis of the second reflector can intersect the first coupling element. In that embodiment, the first reflector is positioned adjacent to the first antenna.

In some embodiments, the antenna apparatus includes a second dielectric layer disposed on the second face of the electromagnetically reflective layer; and a second arrangement of conductors disposed on the second dielectric layer. The second arrangement of conductors includes a second resonator including a third antenna having a respective feed point, a third antenna having a respective feed point, and a second coupling element electrically connecting the respective feed points of the third and fourth antennas; and a second reflector electrically isolated from the second resonator and positioned adjacent to at least one of the third and fourth antennas, and wherein the longitudinal axis of the second reflector intersects the second coupling element.

In some embodiments, the antenna apparatus includes a conductive via extending through the first dielectric layer, the electromagnetically reflective layer and the second dielectric layer, the conductive via electrically connecting the first and second coupling elements; and a dielectric separator interposed between the electromagnetically reflective layer and the via electrically isolating the electromagnetically reflective layer and the via.

One aspect of the disclosure is an antenna apparatus including a electromagnetically reflective layer; a dielectric layer on the electromagnetically reflective layer; a plurality of antennas arranged on the dielectric layer in a respective plurality of directions, each of the plurality of antennas having a feed point; at least one coupling element, wherein each coupling element electrically connects the respective feed points of a respective pair of antennas; and at least one reflector electrically isolated from the plurality of antennas and positioned adjacent to at least one of the plurality of antennas, and wherein the respective longitudinal axis of at least one reflector intersects the first coupling element.

In some embodiments, each of the plurality of antennas is a folded dipole antenna, and the respective feed point for each antenna comprises first and second feed terminals, and wherein each coupling element includes first and second conductive traces, the first conductive trace electrically connecting the respective first feed terminals of a pair of antennas, and the second conductive trace electrically connecting the respective second feed terminals of the same pair of antennas.

BRIEF DESCRIPTION OF THE DRAWINGS

FIG. 1C is the plan view of the antenna apparatus of FIG. 1A illustrated with an approximation of the radiation pattern of the antenna apparatus.

FIG. 1D is the cross-sectional view of the antenna apparatus of FIG. 1B shown with an approximation of the radiation pattern of the antenna apparatus.

Figure 1A:
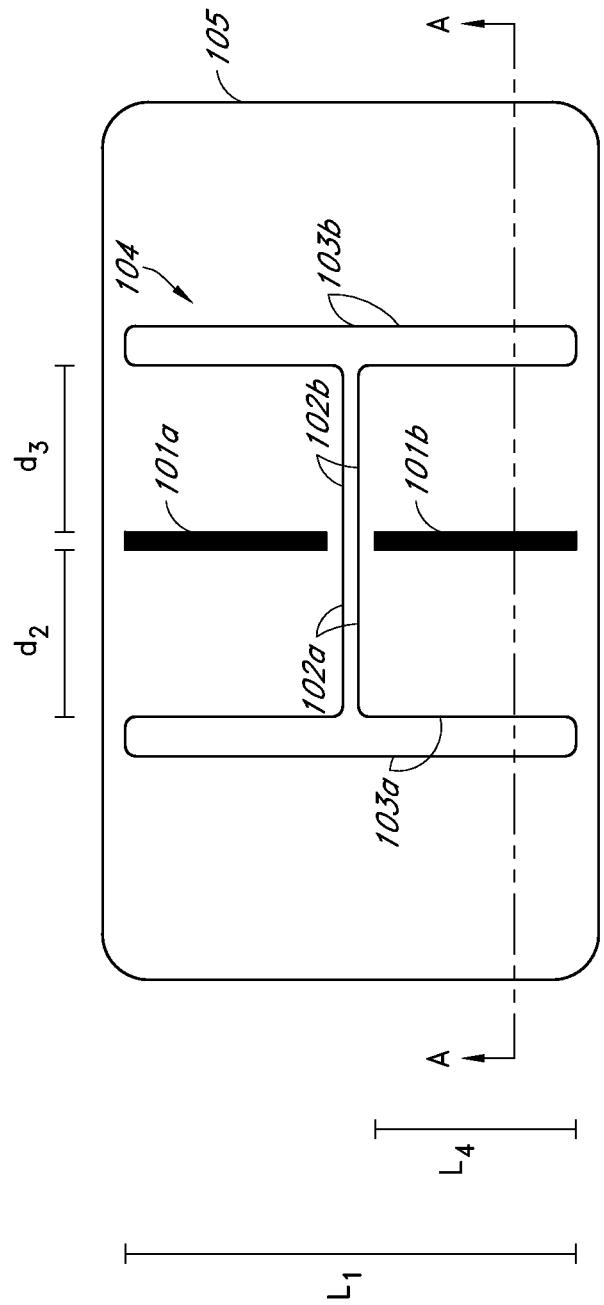
FIG. 1A is a plan view of one embodiment of an antenna apparatus.

The various features illustrated in the drawings may not be drawn to scale. Accordingly, the dimensions of the various features may be arbitrarily expanded or reduced for clarity. In addition, some of the drawings may not depict all of the components of a given system, method or apparatus. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Some embodiments provide a relatively small antenna apparatus that acts as a passive repeater. The antenna apparatus can be designed to facilitate radio frequency (RF) signal gain for a collection or range of frequencies. Some embodiments are configured to be used with mobile phone networks (e.g., networks operating at 1.920 GHz or other frequencies), wireless data networks (e.g., Wi-Fi networks operating at 2.4 GHz and/or 5.8 GHz), other frequencies, or combinations of frequencies. In some embodiments, the antenna apparatus is placed within a short range, such as, for example, a distance of about 6-24 inches, of a device with a wireless receiver and/or transmitter, where the antenna apparatus causes increased RF signal intensity at the device by coupling RF signals from a proximate area of higher RF signal intensity into the area around the device. Other configurations and ranges are possible, and, in some embodiments, increased RF signal intensity can extend over larger distances. Accordingly, in some instances, an embodiment of the antenna apparatus can be used to increase the RF signal intensity in a null spot or dead spot by coupling RF signal energy from an area proximate to the null spot that has higher RF signal intensity.

Figure 1B:
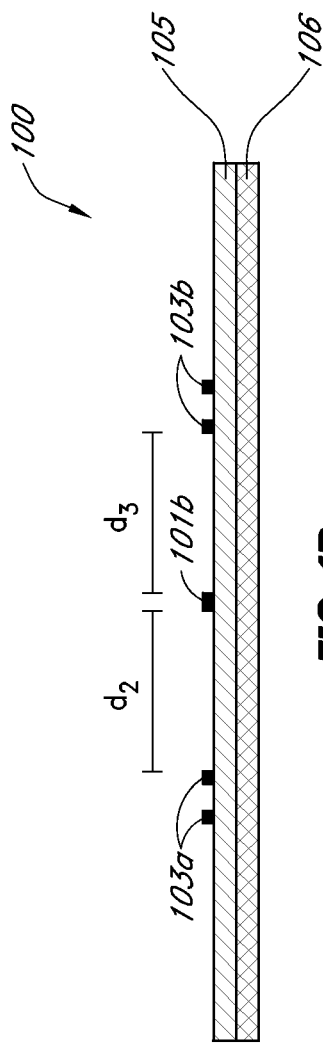
FIG. 1B is a cross-sectional view of the antenna apparatus of FIG. 1A taken along line A-A.

FIG. 1A is a plan view of an antenna apparatus 100, and FIG. 1B is a cross-sectional view of the antenna apparatus 100 in FIG. 1A taken along line A-A. The antenna apparatus 100 illustrated in FIGS. 1A and 1B includes an electromagnetically reflective layer 106, a dielectric layer 105 disposed adjacent to the electromagnetically reflective layer 106, and an arrangement of conductors disposed on the dielectric layer 105. In the illustrated embodiment, the dielectric layer 105 is disposed between the arrangement of conductors and the electromagnetically reflective layer 106. As described in further detail below, the arrangement of conductors includes a resonator 104 and a reflector comprising first and second portions 101a, 101b.

In some embodiments, the electromagnetically reflective layer 106 includes a rigid conductive plate. For example, the conductive plate can be, without limitation, a plate of aluminum, copper, another metal, a metal alloy, conductive ceramic, a conductive composite material having a thickness sufficient to be substantially rigid, another suitable material, or a combination of materials. In some embodiments, the electromagnetically reflective layer 106 is flexible. For example, the electromagnetically reflective layer 106 can be, without limitation, a plate of aluminum, copper, another metal, a metal alloy, a conductive ceramic and/or a conductive composite material having a thickness sufficient to be substantially flexible. Additionally, the composite material may include a conductive thread including one or more metals and/or metal alloys woven to form a plane or sheet. Additionally and/or alternatively, the electromagnetically reflective layer can be a heterogeneous structure including a combination of dielectric and conductive portions, but nevertheless remaining substantially reflective to electromagnetic energy.

The resonator 104 includes first and second antennas 103a, 103b electrically connected by a coupling element. For the sake of facilitating the present description only, the coupling element is labeled as having two portions 102a, 102b. In the antenna apparatus 100, the two portions of the coupling element 102a, 102b can be arranged so as to be collinear, forming a straight conductive path between the first and second antennas 103a, 103b.

The reflector includes first and second portions 101a, 101b separated by a gap through which the coupling element extends and intersects the longitudinal axis of the reflector. In some embodiments, the reflector is a single conductor (not shown), and the antenna apparatus 100 further includes a dielectric separator (not shown) between the reflector and the coupling element. The dielectric separator is provided to electrically isolate the reflector and the coupling element. In other words the dielectric separator prevents the reflector from shorting to the coupling element.

The first and second antennas 103a, 103b are folded dipole antennas, and the respective feed point of each of the first and second antennas 103a, 103b includes respective first and second feed terminals. Accordingly, the two portions of the coupling element 102a, 102b include first and second parallel conductive traces. The first conductive trace electrically connects the respective first feed terminals of the first and second antennas 103a, 103b. The second conductive trace electrically connects the respective second feed terminals of the first and second antennas 103a, 103b.

Each of the first and second folded dipole antennas 103a, 103b is defined by a length $L_1$. The tips of a folded dipole antenna are folded back until they almost meet at the feed point, such that the antenna comprises one entire wavelength. Accordingly, so long as the first and second feed point terminals are sufficiently close to one another, the wavelength of each of the first and second folded dipole antennas 103a, 103b is $2L_1$. Those skilled in the art will appreciate that this arrangement has a greater bandwidth than a standard half-wave dipole. Moreover, the length of each of the first and second portions of the reflector 101a, 101b is length $L_4$, which is approximately $\frac{1}{2}L_1$. However, while the first and second reflector portions 101a, 101b are approximately the same length in FIG. 1A, in other embodiments, the first and second reflector portions 101a, 101b are different lengths. The lengths of the first and second antennas can be used to determine the dimensions of the antenna apparatus 100.

For example, some embodiments are configured to be used with mobile phone networks (e.g., networks operating at 1.920 GHz or other frequencies), wireless data networks (e.g., Wi-Fi networks operating at 2.4 GHz and/or 5.8 GHz), other frequencies, or combinations of frequencies. As such, the wavelengths associated with such frequencies could be used to define $L_1$, as being a quarter, a half or full wavelength associated with the center frequency of the band.

Additionally, the first folded dipole antenna 103a is spaced from the reflector portions 101a, 101b by a distance $d_2$, and the second folded dipole antenna 103b is spaced from the reflector portions 101a, 101b by a distance $d_3$. The distances $d_2$, $d_3$ can be equal or different. However, those skilled in the art will appreciate that an asymmetric spacing will have an impact on the radiation pattern of the antenna apparatus 100.

While the first and second antennas 103a, 103b illustrated in FIG. 1A are folded dipole antennas those skilled in the art will appreciate from the present disclosure that the first and second antennas 103a, 103b can be each individually configured, without limitation, as one of a monopole antenna, a dipole antenna, a rhombic antenna, a planar antenna, and a yagi antenna. Those skilled in the art will appreciate that the radiation pattern of the resulting antenna apparatus will change as a function of the antenna types chosen for the respective first and second antennas 103a, 103b.

FIG. 1C is the plan view of the antenna apparatus 100 of FIG. 1A illustrated with an approximation of the radiation pattern of the antenna apparatus. Similarly, FIG. 1D is the cross-sectional view of the antenna apparatus 100 shown with a cross-sectional view of the same approximation of the radiation pattern of the antenna apparatus 100. With reference to both FIGS. 1C and 1D, the reflector portions 101a, 101b distort the toriodal radiation patterns of the first and second folded dipole antennas 103a, 103b. For the first folded dipole antenna 103a the result is a radiation pattern approximated by the dashed line 110a in FIGS. 1C and 1D. For the second folded dipole antenna 103b the result is a radiation pattern approximated by the dashed line 110b in FIGS. 1C and 1D. In operation, RF signals received by one of the antennas are coupled through the coupling element and propagated by through the respective radiation pattern of the other.

Figure 2A:
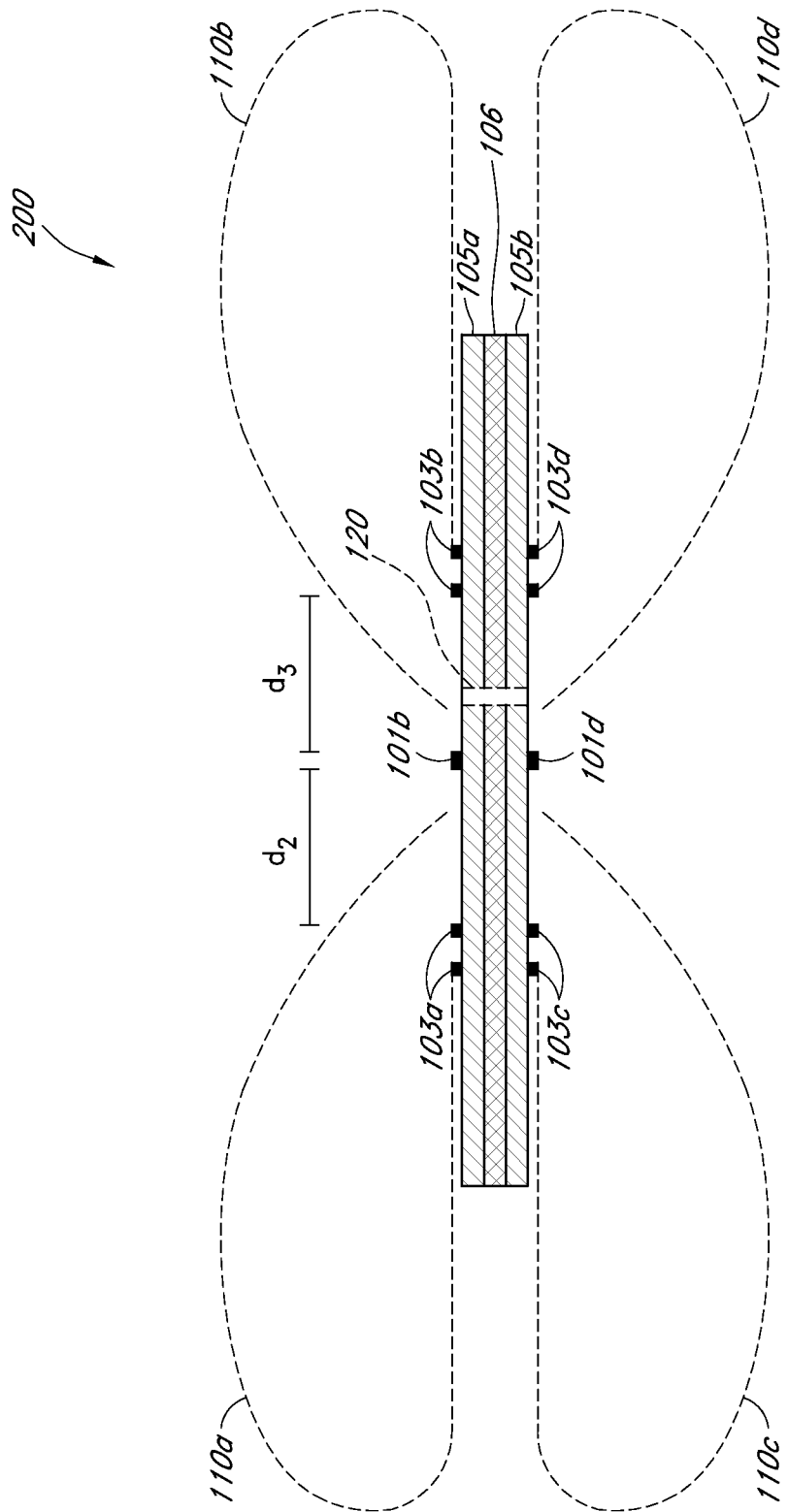
FIG. 2A is a cross-sectional view of one embodiment of an antenna apparatus.
Figure 2B:
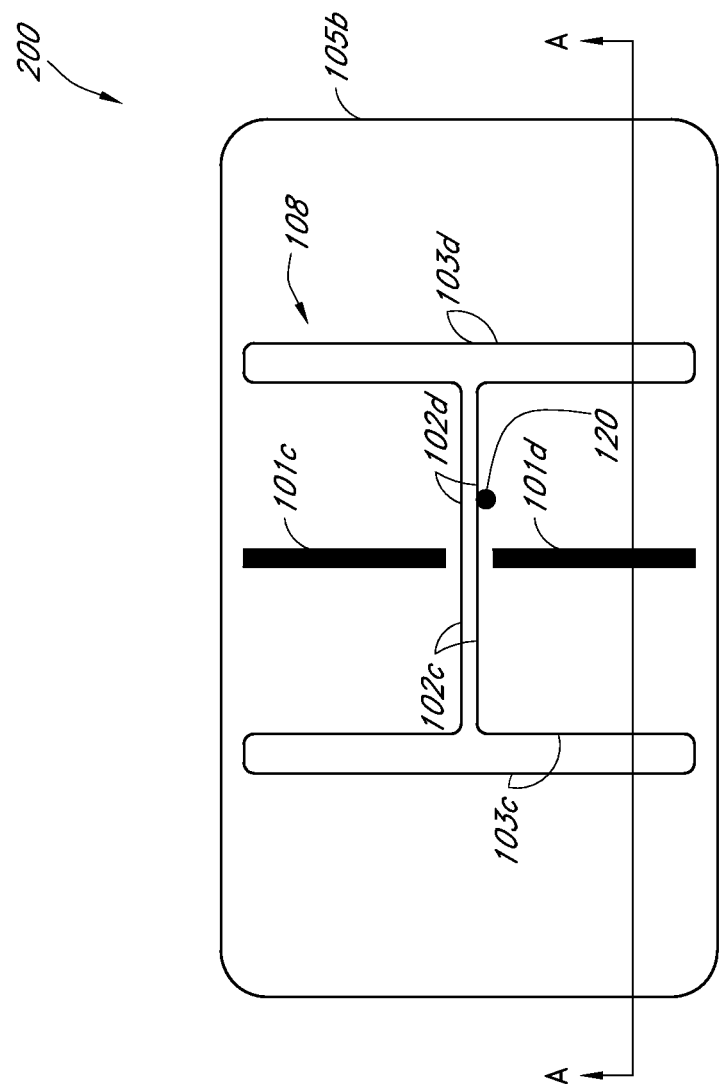
FIG. 2B is a plan view of the antenna apparatus of FIG. 2A.

FIGS. 2A and 2B provide views of an antenna apparatus 200. The antenna apparatus 200 illustrated in FIGS. 2A and 2B is similar to and adapted from the antenna apparatus 100 illustrated in FIG. 1A. Accordingly, elements common to both antenna apparatus 100 and 200 share common reference indicia, and only differences between the antenna apparatus 100 and 200 are described herein for the sake of brevity. However, for the sake of facilitating the description only, the dielectric layer 105 shown in FIGS. 1A-1D has been relabeled as the first dielectric layer 105a in FIGS. 2A-2B.

More specifically, FIG. 2A is a cross-sectional view the antenna apparatus 200, and FIG. 2B is a plan view of the antenna apparatus 200. In addition to the elements illustrated in FIGS. 1A-1B, the antenna apparatus illustrated in FIGS. 2A-2B includes a second dielectric layer 105b on the second face of the electromagnetically reflective layer 106, and an arrangement of conductors on the second dielectric layer 105b. The arrangement of conductors on the second dielectric layer 105b includes a resonator 108 and a reflector comprising first and second portions 101c, 101d.

In some embodiments, the antenna apparatus 200 additionally includes an optional conductive via 120 extending through the first dielectric layer 105a, the electromagnetically reflective layer 106 and the second dielectric layer 105b. The conductive via 120 electrically connects the first and second coupling elements. Additionally, a dielectric separator is interposed between the electromagnetically reflective layer 106 and the conductive via 120 in order to electrically isolate one from the other.

The resonator 108 includes third and fourth antennas 103c, 103d electrically connected by a coupling element. For the sake of facilitating the present description only, the coupling element is labeled as having two portions 102c, 102d. In the antenna apparatus 200 the two portions of the coupling element 102c, 102d are arranged so as to be collinear forming a straight conductive path between the third and fourth antennas 103c, 103d.

The reflector includes first and second portions 101c, 101d separated by a gap through which the coupling element extends and intersects the longitudinal axis of the reflector. In some embodiments, the reflector is a single conductor (not shown), and the antenna apparatus 200 further includes a dielectric separator (not shown) between the reflector and the coupling element. The dielectric separator is provided to electrically isolate the reflector and the coupling element. In other words the dielectric separator prevents the reflector from shorting to the coupling element.

The third and fourth antennas 103c, 103d are folded dipole antennas, and the respective feed point of each of the third and fourth antennas 103c, 103d includes respective first and second feed terminals. Accordingly, the two portions of the coupling element 102c, 102d include first and second parallel conductive traces. The first conductive trace electrically connects the respective first feed terminals of the third and fourth antennas 103c, 103d. The second conductive trace electrically connects the respective second feed terminals of the third and fourth antennas 103c, 103d.

Those skilled in the art will recognize from the present disclosure and drawings that the respective arrangements of conductors on the respective first and second dielectric layers 105a, 105b are substantially identical. The resulting radiation pattern for the antenna apparatus 200 is therefore substantially symmetric. In particular, the radiation pattern of the created by the reflector portions 101c, 101d and the third and fourth antennas 103c, 103d being the substantial mirror image of the radiation pattern created by the reflector portions 101a, 101b and the first and second antenna 103a, 103b.

FIG. 2A shows a cross-sectional view of an approximation of the radiation pattern for the antenna apparatus 200. The reflector portions 101a, 101b distort the toroidal radiation patterns of the first and second folded dipole antennas 103a, 103b. The reflector portions 101c, 101d distort the toroidal radiation patterns of the third and fourth folded dipole antennas 103c, 103d. For the first folded dipole antenna 103a the result is a radiation pattern approximated by the dashed line 110a. For the second folded dipole antenna 103b the result is a radiation pattern approximated by the dashed line 110b. For the third folded dipole antenna 103c the result is a radiation pattern approximated by the dashed line 110c. For the fourth folded dipole antenna 103d the result is a radiation pattern approximated by the dashed line 110d. In operation, RF signals received by one of the antennas are coupled through the coupling element and propagated by through the respective radiation pattern of the other. The via 120 allows signal energy to be received on one side of the electromagnetically reflective layer 106 and propagated through the radiation patterns of the respective antennas on the other side of the electromagnetically reflective layer 106.

Those skilled in the art will also appreciate from the present disclosure that the respective arrangements of conductors do not have to be substantially identical, and can instead be configured in any number of ways in order to create different radiation patterns for one or more of the first, second, third and fourth antennas.

Figure 3:
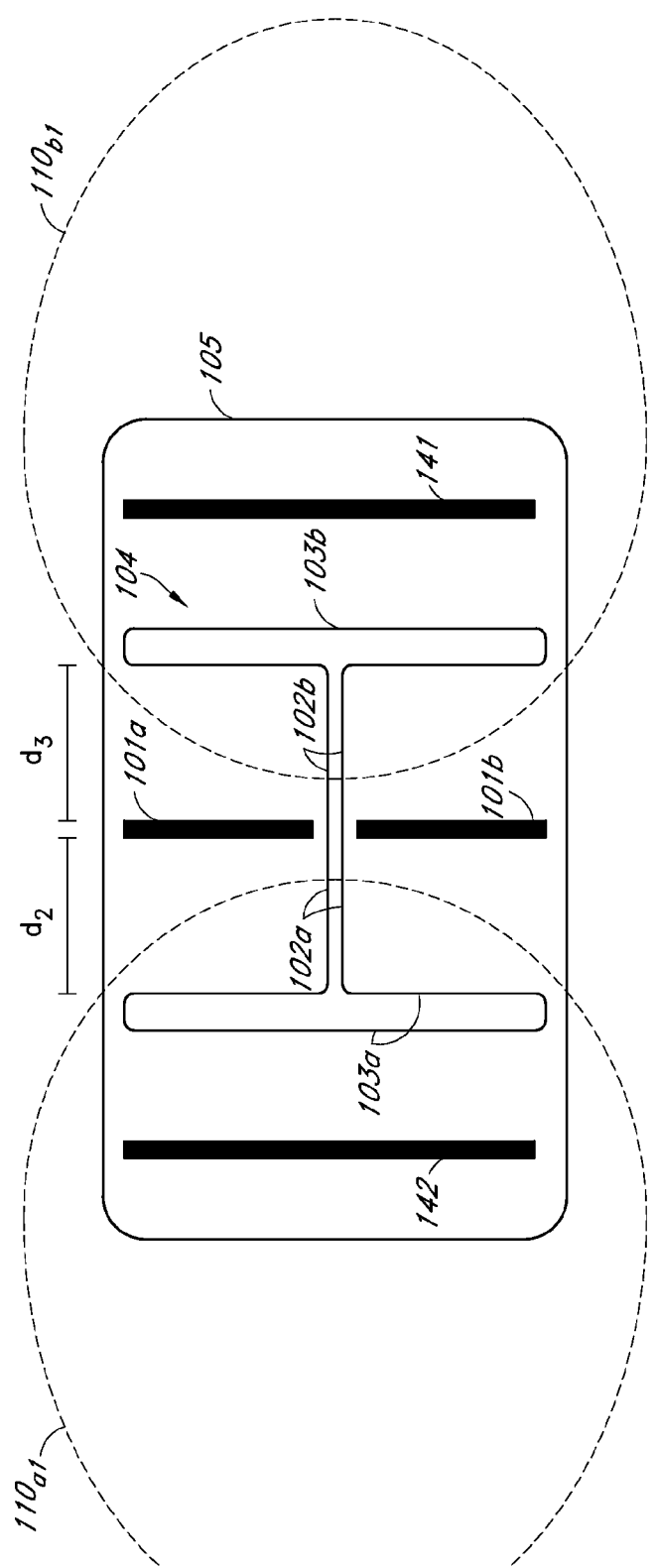
FIG. 3 is a plan view of one embodiment of an antenna apparatus illustrated with an approximation of the radiation pattern of the antenna apparatus.

FIG. 3 is a plan view of an antenna apparatus 300 illustrated with an approximation of its radiation pattern. The antenna apparatus 300 illustrated in FIG. 3 is similar to and adapted from the antenna apparatus 100 illustrated in FIG. 1A. Accordingly, elements common to both antenna apparatus 100 and 300 share common reference indicia, and only differences between the antenna apparatus 100 and 300 are described herein for the sake of brevity.

With reference to FIG. 3 the first arrangement of conductors additionally includes first and second director elements 142, 141. The first director 142 is positioned adjacent the first folded dipole antenna 103a, such that the first folded dipole antenna 103a is between the reflector portions 101a, 101b and the first director 142. The second director 141 is positioned adjacent the second folded dipole antenna 103b, such that the second folded dipole antenna 103b is between the reflector portions 101a, 101b and the second director 141. While the antenna apparatus 300 includes a director element adjacent each of the first and second antennas 103a, 103b, in another embodiment an antenna apparatus includes a single director adjacent one of the first and second antennas. In such an embodiment, the radiation pattern will be different from the approximated radiation pattern illustrated in FIG. 3. In another embodiment, an antenna apparatus includes multiple directors adjacent one of the first and second antennas.

As compared to the approximated radiation pattern illustrated in FIG. 1C, the first and second directors 142, 141 of FIG. 3 elongate the radiation pattern on either side of the reflector portions 101a, 101b. For the first folded dipole antenna 103a the result is an elongated radiation pattern approximated by the dashed line $110a_1$. For the second folded dipole antenna 103b the result is an elongated radiation pattern approximated by the dashed line $110b_1$.

Figure 4:
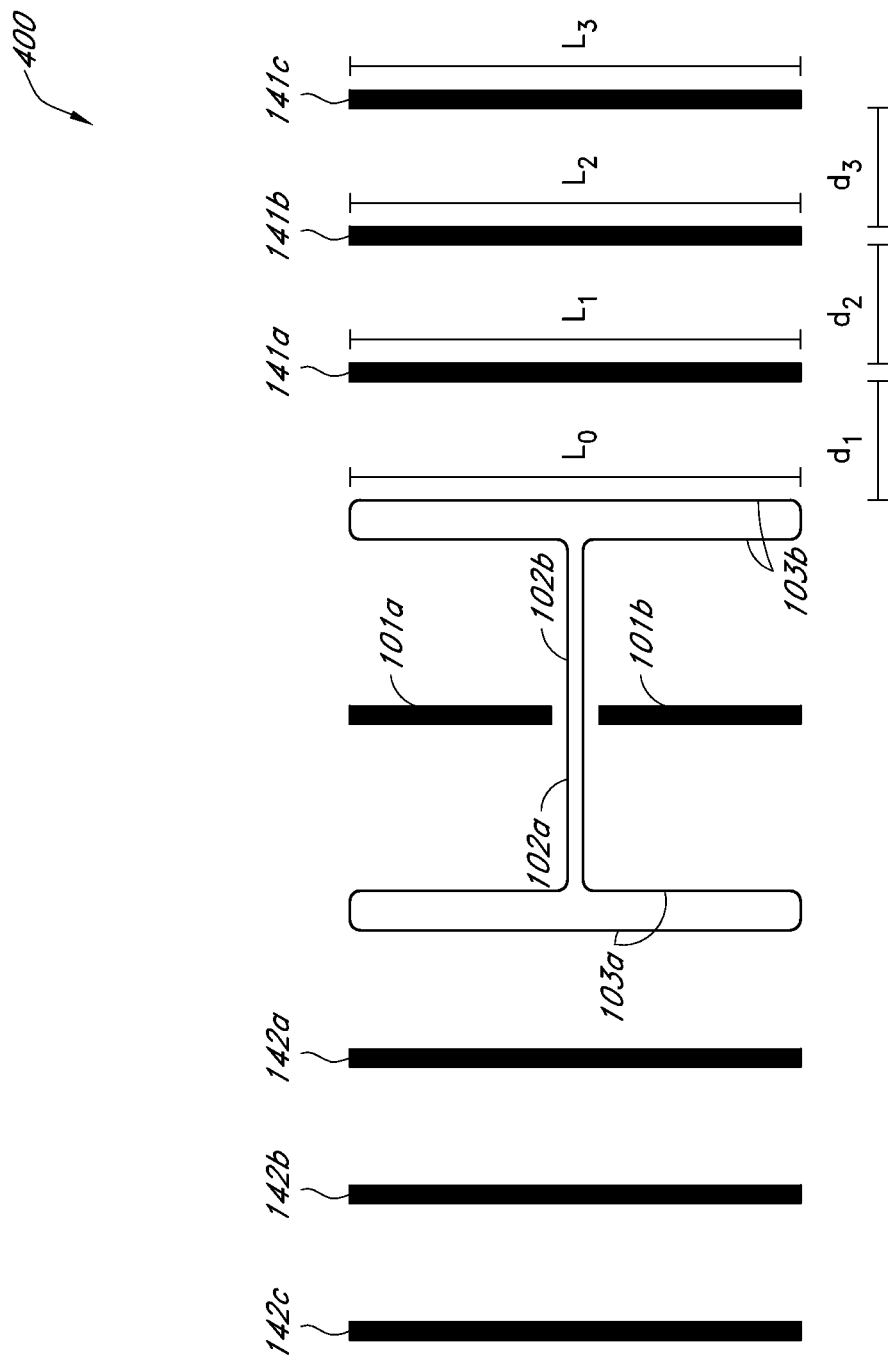
FIG. 4 is a plan view of one embodiment of an antenna apparatus.

FIG. 4 is a plan view of an antenna apparatus 400, in which only the arrangement of conductors disposed on the dielectric layer is shown. The antenna apparatus 400 illustrated in FIG. 4 is similar to and adapted from the antenna apparatus 100 illustrated in FIG. 1A. Accordingly, elements common to both antenna apparatus 100 and 400 share common reference indicia, and only differences between the antenna apparatus 100 and 400 are described herein for the sake of brevity.

With reference to FIG. 4, the arrangement of conductors additionally includes a plurality of directors 142a, 142b, 142c parallel to the reflector portions 101a, 101b, and positioned such that the first folded dipole antenna 103a is between the plurality of directors 142a, 142b, 142c and the reflector portions 101a, 101b. Additionally, the arrangement of conductors additionally includes a plurality of directors 141a, 141b, 141c parallel to the reflector portions 101a, 101b, and positioned such that the second folded dipole antenna 103b is between the plurality of directors 141a, 141b, 141c and the reflector portions 101a, 101b. While only three directors are shown with each antenna in FIG. 4, those skilled in the art will appreciate that an antenna can be provided with any number of directors or even no directors at all. Moreover, each antenna may include more or less directors than other antennas in the same apparatus.

The respective distances between the directors can be varied to change the radiation pattern of the antenna apparatus 400. Examples are described in further detail below with further reference to FIG. 4, in which the distances $d_1$, $d_2$, and $d_3$ correspond to the respective distance between the second folded dipole antenna 103b and the director 141a, the respective distance between the directors 141a, 141b, and the respective distance between the directors 141b, 141c.

The respective lengths of the directors can be varied to change the bandwidth of the antenna apparatus 400. Examples are described in further detail below with further reference to FIG. 4, in which the lengths $L_0$, $L_1$, $L_2$, and $L_3$ correspond to the length of the second folded dipole antenna 103b, the director 141a, the director 141b, and the director 141c, respectively.

In some embodiments, the plurality of directors are arranged so that the respective distance between adjacent directors decreases between successive pairs of directors starting from the distance between the first of the plurality of directors immediately adjacent to one of the first and second antennas. For example, with further reference to FIG. 4, when the distances $d_1$, $d_2$, and $d_3$ are such that $d_1 < d_2, < d_3$ the radiation pattern of the second folded dipole antenna 103b bulges outward parallel to the longitudinal axis of the reflector portions 101a, 101b.

In some embodiments, the plurality of directors are arranged so that the respective distance between adjacent directors increases starting from the distance between the first of the plurality of directors immediately adjacent to one of the first and second antennas. For example, with further reference to FIG. 4, when the distances $d_1$, $d_2$, and $d_3$ are such that $d_1 > d_2, > d_3$ the radiation pattern of the second folded dipole antenna 103b elongates in a manner similar to the radiation pattern $110b_1$ illustrated in FIG. 3.

In some embodiments, the plurality of directors are configured so that the length of a particular director is shorter than the immediately adjacent director starting from the first of the plurality of directors immediately adjacent to one of the first and second antennas. For example, with further reference to FIG. 4, when the lengths $L_1$, $L_2$, and $L_3$ are such that $L_1 < L_2, < L_3$ the radiation pattern of the second folded 103b dipole antenna increases on the higher frequency end of the bandwidth.

In some embodiments, the plurality of directors are configured so that the length of a particular director is longer than the immediately adjacent director starting from the first of the plurality of directors immediately adjacent to one of the first and second antennas. For example, with further reference to FIG. 4, when the lengths $L_1$, $L_2$, and $L_3$ are such that $L_1 > L_2$, $> L_3$ the bandwidth of the second folded dipole antenna 103b increases on the lower frequency end of the bandwidth.

Figure 5:
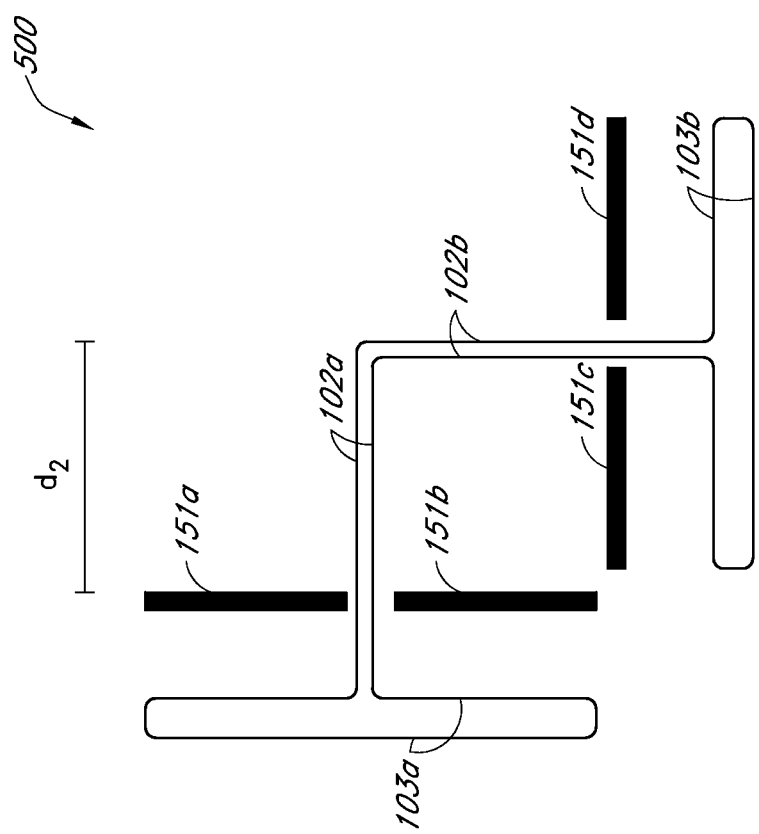
FIG. 5 is a plan view of one embodiment of an antenna apparatus.

FIG. 5 is a plan view of an antenna apparatus 500, in which only the arrangement of conductors disposed on the dielectric layer is shown. The antenna apparatus 500 illustrated in FIG. 5 is similar to and adapted from the antenna apparatus 100 illustrated in FIG. 1A. Accordingly, elements common to both antenna apparatus 100 and 500 share common reference indicia, and only differences between the antenna apparatus 100 and 500 are described herein for the sake of brevity.

In contrast to FIG. 1A, with reference to FIG. 5, the two portions of the coupling element 102a, 102b meet at a corner and the first and second antennas 103a, 103b are arranged facing respective first and second directions. While the two portions of the coupling element 102a, 102b are illustrated as being perpendicular to one another, those skilled in the art will appreciate from the present disclosure that the two portions of the coupling element 102a, 102b can be arranged at any angle in order to customize the radiation pattern of the antenna apparatus.

Additionally, the antenna apparatus 500 includes two reflectors. The first reflector includes portions 151a, 151b separated by a gap through which the first coupling element portion 102a extends and intersects the longitudinal axis of the first reflector. The second reflector includes portions 151c, 151d separated by a gap through which the second coupling element portion 102b extends and intersects the longitudinal axis of the second reflector.

Additionally, the distance between the reflector portions 151a, 151b and the corner is $d_2$, and the distance between the reflector portions 151c, 151d and the corner is $d_3$. The distances $d_2$, $d_3$ can be equal or different.

Figure 6:
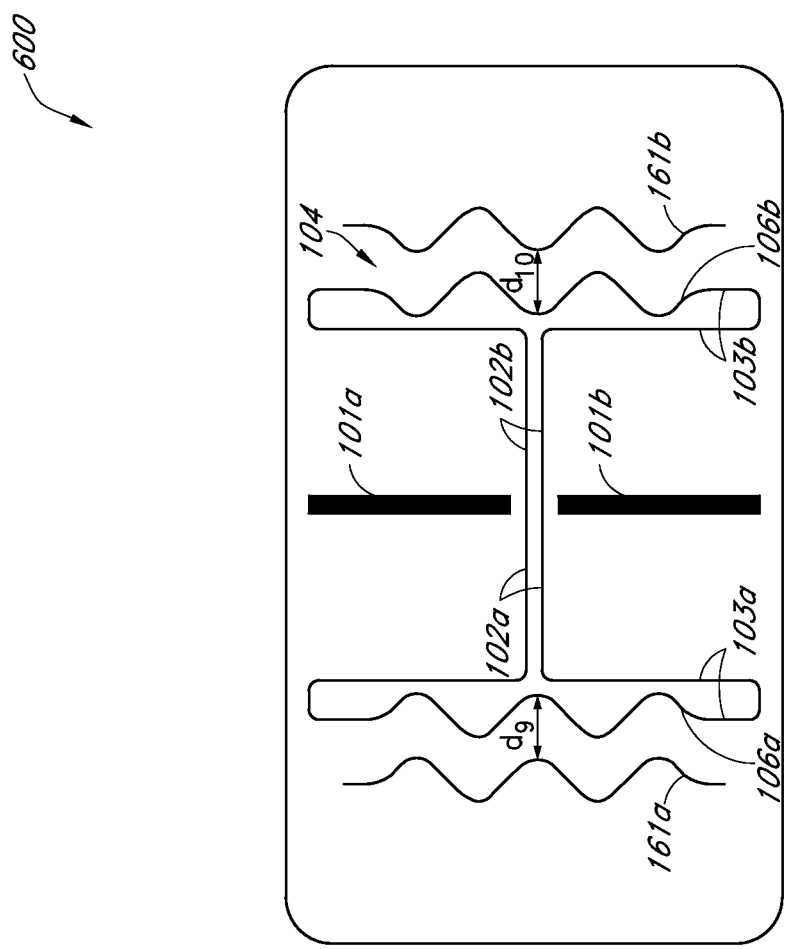
FIG. 6 is a plan view of one embodiment of an antenna apparatus.

FIG. 6 is a plan view of an antenna apparatus 600, in which only the arrangement of conductors disposed on the dielectric layer is shown. The antenna apparatus 600 illustrated in FIG. 6 is similar to and adapted from the antenna apparatus 100 illustrated in FIG. 1A. Accordingly, elements common to both antenna apparatus 100 and 600 share common reference indicia, and only differences between the antenna apparatus 100 and 600 are described herein for the sake of brevity.

With reference to FIG. 6, the first folded dipole antenna 103a includes an undulating portion 106a. The undulating portion 106a is duplicated by the director 161a such that the distance $d_9$ between corresponding points on the undulating portion 106a and the director 161a is substantially constant along the length of each. Similarly, the second folded dipole antenna 103b includes an undulating portion 106b. The undulating portion 106b is duplicated by the director 161b such that the distance $d_{10}$ between corresponding points on the undulating portion 106b and the director 161b is substantially constant along the length of each. The undulating portions 106a, 106b allow the antenna apparatus to be scaled down while substantially preserving the defining wavelengths of the first and second folded dipole antennas 103a, 103b. While only one director is shown with each antenna in FIG. 6, those skilled in the art will appreciate that an antenna can be provided with any number of directors or even no directors at all. For example, each dipole antenna 103a, 103b shown in FIG. 6 can include two directors. Moreover, each antenna may include more or less directors than other antennas in the same apparatus.

Moreover, in some embodiments, the curvature of the undulations is configured to reduce the concentration of RF energy at inflection points where the metal traces change directions. By contrast, those skilled in the art will appreciate from the present disclosure that sharp corners (e.g. creating a zig-zag) pattern would result in a concentration of RF energy at the corners, which thereby substantially changes the density of RF energy along the length of the first and second antennas and/or the director elements.

Figure 7:
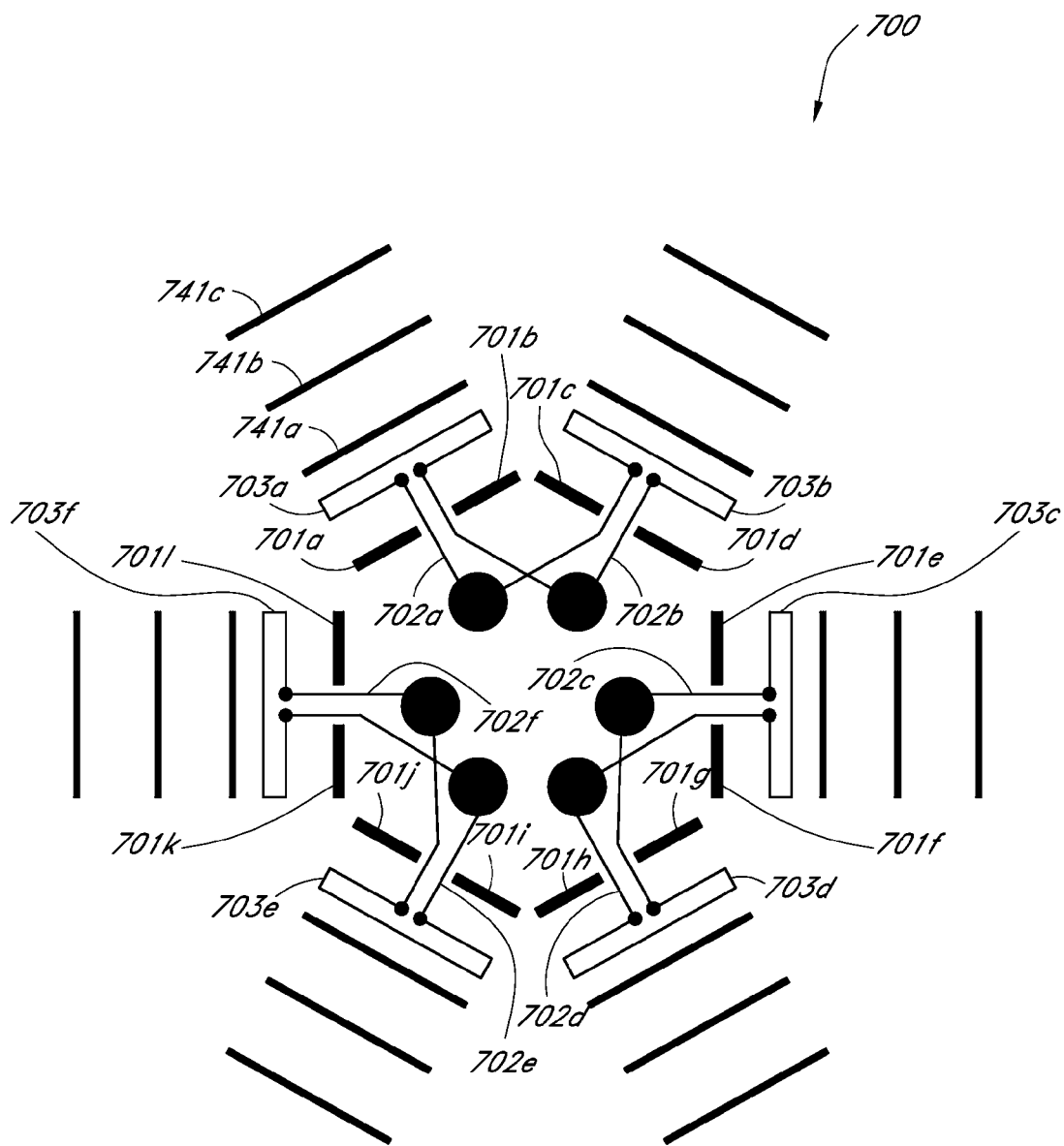
FIG. 7 is a plan view of one embodiment of an antenna apparatus.

FIG. 7 is a plan view of an antenna apparatus 700, in which only the arrangement of conductors disposed on the dielectric layer is shown. The arrangement of conductors includes folded dipole antennas 703a, 703b, 703c, 703d, 703e, 703f, reflector portions 701a, 701b, 701c, 701d, 701e, 701f, 701g, 701h, 701i, 701j, 701k, 701l, and conductive traces 702a, 702b, 702c, 702d, 702e, 702f. Each folded dipole antenna 703a, 703b, 703c, 703d, 703e, 703f is provided with an adjacent plurality of directors. For example, the folded dipole antenna 703a is provided with directors 741a, 741b, 741b. While only three directors are shown in FIG. 7, those skilled in the art will appreciate that an antenna can be provided with any number of directors or even no directors at all. Moreover, each antenna may include more or less directors than other antennas in the same apparatus.

The folded dipole antennas 703a, 703b, 703c, 703d, 703e, 703f are arranged in a hexagonal approximation of a circle. Each of the folded dipole antennas 703a, 703b, 703c, 703d, 703e, 703f is paired with one adjacent antenna. Specifically, antennas 703a and 703b are paired, antennas 703c and 703d are paired, and antennas 703e and 703f are paired. The result is that the radiation pattern formed by a pair of antennas approximates a bent pipe from one side of the arrangement of antennas to an adjacent side, such that signals received on one side are propagated from the adjacent side.

Conductive traces 702a, 702b electrically connect the respective first and second feed terminals of the antennas 703a, 703b. Conductive traces 702c, 702d electrically connect the respective first and second feed terminals of the antennas 703c, 703d. Conductive traces 702e, 702f electrically connect the respective first and second feed terminals of the antennas 703e, 703f.

The conductive traces 702a, 702b extend through a gap separating reflector portions 701a, 701b. The conductive traces 702a, 702b also extend through a gap separating reflector portions 701c, 701d. The conductive traces 702c, 702d extend through a gap separating reflector portions 701e, 701f. The conductive traces 702c, 702d also extend through a gap separating reflector portions 701g, 701h. The conductive traces 702e, 702f extend through a gap separating reflector portions 701i, 701j. The conductive traces 702e, 702f also extend through a gap separating reflector portions 701k, 701l.

Figure 8:
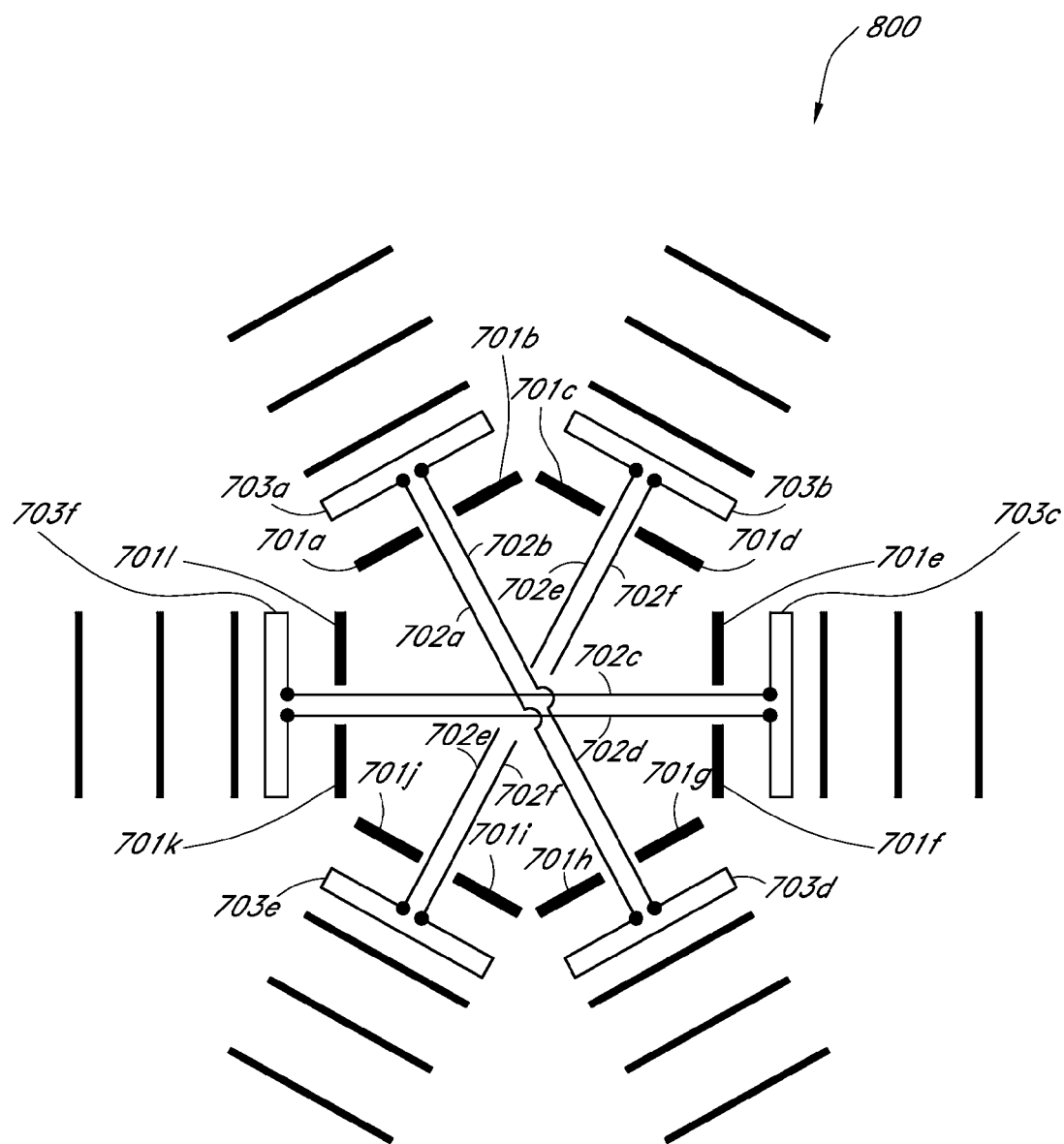
FIG. 8 is a plan view of one embodiment of an antenna apparatus.

FIG. 8 is a plan view of an antenna apparatus 800, in which only the arrangement of conductors disposed on the dielectric layer is shown. The antenna apparatus 800 illustrated in FIG. 8 is similar to and adapted from the antenna apparatus 700 illustrated in FIG. 7. Accordingly, elements common to both antenna apparatus 700 and 800 share common reference indicia, and only differences between the antenna apparatus 700 and 800 are described herein for the sake of brevity.

As compared to the antenna apparatus 700, each of the folded dipole antennas 703a, 703b, 703c, 703d, 703e, 703f is respectively electrically paired and connected to the corresponding folded dipole antenna diametrically opposite a particular one of the folded dipole antennas. Specifically, antennas 703a and 703d are electrically coupled by parallel conductive traces 702a, 702b, antennas 703b and 703e are electrically coupled by parallel conductive traces 702e, 702f, and antennas 703c and 703f are electrically coupled by parallel conductive traces 702c, 702d. The conductive traces 702e, 702f electrically coupled to antennas 703b, 703e are partially hidden to simplify the view in FIG. 8; those traces 702e, 702f are configured to electrically couple the antennas 703b, 703e despite a portion of the traces 702e, 702f not being shown. The result is that the radiation pattern formed by a pair of antennas approximately extends from one side of the arrangement of antennas through to a diametrically opposite side, such that signals received on one side are propagated from the diametrically opposite side.

Additionally and/or alternatively, an embodiment of antenna apparatus can be combined with a user interface. The user interface may include a detector circuit and a user-readable display, such as a series of diodes or a liquid crystal display. In some embodiments, the detector circuit is coupled between the resonant structure of an antenna apparatus and the user interface. The detector circuit can be configured to draw off a small portion of RF signal energy received by one or more of the antennas in operation. The detector can provide a signal to the user interface according to how much RF signal energy is detected. For example, the detector can be configured to detect RF signal energy in relation to two or more threshold levels. If RF signal energy is lower than a first threshold level, the detector signals that the RF signal energy is very weak or non-existent. If RF signal energy is between the first and second threshold levels, the detector signals that the RF signal energy is low. If RF signal energy is higher than the second threshold level, the detector signals that the RF signal energy is strong. In response to receiving the detector signal, the user interface provides a corresponding user readable output that can be interpreted by a user. The user readable output can include one or more visual indicators, displays, lamps, other output devices, or a combination of devices. In some embodiments, the user interface and/or the detector circuit can be disposed in a single housing that also contains the antenna apparatus.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An antenna apparatus comprising:
an electromagnetically reflective layer, the electromagnetically reflective layer having first and second faces;
a first dielectric layer disposed on the first face of the electromagnetically reflective layer; and
a first arrangement of conductors disposed on the first dielectric layer, the first arrangement of conductors comprising:
a first resonator including a first antenna having a respective feed point, a second antenna having a respective feed point, and a first coupling element electrically connecting the respective feed points of the first and second antennas; and
a first reflector electrically isolated from the first resonator and positioned adjacent to at least one of the first and second antennas, and
wherein a longitudinal axis of the first reflector intersects the first coupling element;
wherein the antenna apparatus is configured as a passive repeater antenna; and
wherein a plane of the electromagnetically reflective layer extends parallel to an entire plane of the first arrangement of conductors;
wherein the first and second antennas are folded dipole antennas, and the respective feed point for each of the first and second antennas comprises first and second feed terminals, and wherein the coupling element includes first and second conductive traces, the first conductive trace electrically connecting the respective first feed terminals of the first and second antennas, and the second conductive trace electrically connecting the respective second feed terminals of the first and second antennas;
wherein the first arrangement of conductors further comprises at least one director in parallel with the first reflector, and wherein one of the first and second antennas is positioned between the at least one director and the first reflector.

2. The antenna apparatus of claim 1, wherein the electromagnetically reflective layer is flexible.

3. The antenna apparatus of claim 1, wherein the first reflector comprises first and second conductive portions separated by a gap through which the first coupling element extends and intersects the longitudinal axis of the reflector.

4. The antenna apparatus of claim 1, wherein the first reflector comprises a single conductor, and the antenna apparatus further comprises a dielectric separator interposed between the first reflector and the first coupling element.

5. The antenna apparatus of claim 1, wherein at least one of the first and second antennas is one of a dipole antenna, a rhombic antenna, a planar antenna, and a yagi antenna.

6. The antenna apparatus of claim 1, wherein at least one of the first and second antennas includes a smoothly undulating portion.

7. The antenna apparatus of claim 1, wherein the first arrangement of conductors further comprises:
a second reflector electrically isolated from the first resonator and positioned adjacent to the second antenna, and wherein the longitudinal axis of the second reflector intersects the first coupling element, and wherein the first reflector is positioned adjacent to the first antenna.

8. The antenna apparatus of claim 7, wherein the first coupling element is straight and the first and second antennas are arranged so that the respective radiation pattern of one extends in the substantially opposite direction of the other.

9. The antenna apparatus of claim 7, wherein the first coupling element includes a corner and the first and second antennas are arranged facing respective first and second directions.

10. The antenna apparatus of claim 7, wherein the first arrangement of conductors further comprises at least one director in parallel with at least one of the first and second reflectors, and wherein a respective one of the first and second antennas is positioned between the at least one director and respective one of the first and second reflectors.

11. The antenna apparatus of claim 1, wherein the at least one director comprises a plurality of directors parallel to the first reflector, and wherein one of the first and second antennas is positioned between the plurality of directors and the first reflector.

12. The antenna apparatus of claim 11, wherein the plurality of directors are arranged so that the respective distance between adjacent directors decreases between successive pairs of directors starting from the distance between the first of the plurality of directors immediately adjacent to one of the first and second antennas.

13. The antenna apparatus of claim 11, wherein the plurality of directors are arranged so that the respective distance between adjacent directors increases starting from the distance between the first of the plurality of directors immediately adjacent to one of the first and second antennas.

14. The antenna apparatus of claim 11, wherein the plurality of directors are configured so that the length of a particular director is shorter than the immediately adjacent director starting from the first of the plurality of directors immediately adjacent to one of the first and second antennas.

15. The antenna apparatus of claim 11, wherein the plurality of directors are configured so that the length of a particular director is longer than the immediately adjacent director starting from the first of the plurality of directors immediately adjacent to one of the first and second antennas.

16. The antenna apparatus of claim 1, further comprising:
a second dielectric layer disposed on the second face of the electromagnetically reflective layer; and
a second arrangement of conductors disposed on the second dielectric layer, the second arrangement of conductors comprising:
a second resonator including a third antenna having a respective feed point, a fourth antenna having a respective feed point, and a second coupling element electrically connecting the respective feed points of the third and fourth antennas; and
a second reflector electrically isolated from the second resonator and positioned adjacent to at least one of the third and fourth antennas, and
wherein a longitudinal axis of the second reflector intersects the second coupling element.

17. The antenna apparatus of claim 16, further comprising:
a conductive via extending through the first dielectric layer, the electromagnetically reflective layer and the second dielectric layer, the conductive via electrically connecting the first and second coupling elements; and
a dielectric separator interposed between the electromagnetically reflective layer and the via electrically isolating the electromagnetically reflective layer and the via.

18. An antenna apparatus comprising:
an electromagnetically reflective layer;
a dielectric layer on the electromagnetically reflective layer;
a plurality of antennas arranged on the dielectric layer in a respective plurality of directions, each of the plurality of antennas having a feed point;
at least one coupling element, wherein each coupling element electrically connects the respective feed points of a respective pair of antennas; and
at least one reflector electrically isolated from the plurality of antennas and positioned adjacent to at least one of the plurality of antennas, and wherein a respective longitudinal axis of the at least one reflector intersects the first coupling element;
wherein the antenna apparatus is configured as a passive repeater antenna; and
wherein a plane of the electromagnetically reflective layer extends parallel to an entire plane of the plurality of antennas, the at least one coupling element, and the at least one reflectors;
wherein each of the plurality of antennas is a folded dipole antenna, and the respective feed point for each antenna comprises first and second feed terminals, and wherein each coupling element includes first and second conductive traces, the first conductive trace electrically connecting the respective first feed terminals of a pair of antennas, and the second conductive trace electrically connecting the respective second feed terminals of the same pair of antennas;
wherein a first antenna in the plurality of antennas further comprises at least one director in parallel with a first reflector, and wherein the first antenna is positioned between the at least one director and the first reflector.

19. An antenna apparatus comprising:
an electromagnetically reflective layer, the electromagnetically reflective layer having first and second faces;
a first dielectric layer disposed on the first face of the electromagnetically reflective layer; and
a first arrangement of conductors disposed on the first dielectric layer, the first arrangement of conductors comprising:
a first resonator including a first antenna having a respective feed point, a second antenna having a respective feed point, and a first coupling element electrically connecting the respective feed points of the first and second antennas; and
a first reflector electrically isolated from the first resonator and positioned adjacent to at least one of the first and second antennas, and
wherein a longitudinal axis of the first reflector intersects the first coupling element;
wherein the antenna apparatus is configured as a passive repeater antenna; and
wherein a plane of the electromagnetically reflective layer extends parallel to an entire plane of the first arrangement of conductors;
wherein the first and second antennas are folded dipole antennas, and the respective feed point for each of the first and second antennas comprises first and second feed terminals, and wherein the coupling element includes first and second conductive traces, the first conductive trace electrically connecting the respective first feed terminals of the first and second antennas, and the second conductive trace electrically connecting the respective second feed terminals of the first and second antennas;
wherein the first arrangement of conductors further comprises:
a second reflector electrically isolated from the first resonator and positioned adjacent to the second antenna, and wherein the longitudinal axis of the second reflector intersects the first coupling element,
and wherein the first reflector is positioned adjacent to the first antenna.

20. An antenna apparatus comprising:
an electromagnetically reflective layer, the electromagnetically reflective layer having first and second faces;
a first dielectric layer disposed on the first face of the electromagnetically reflective layer; and a first arrangement of conductors disposed on the first dielectric layer, the first arrangement of conductors comprising:

a first resonator including a first antenna having a respective feed point, a second antenna having a respective feed point, and a first coupling element electrically connecting the respective feed points of the first and second antennas;

a first reflector electrically isolated from the first resonator and positioned adjacent to at least one of the first and second antennas, and wherein a longitudinal axis of the first reflector intersects the first coupling element;

a second dielectric layer disposed on the second face of the electromagnetically reflective layer; and a second arrangement of conductors disposed on the second dielectric layer, the second arrangement of conductors comprising:

a second resonator including a third antenna having a respective feed point, a fourth antenna having a respective feed point, and a second coupling element electrically connecting the respective feed points of the third and fourth antennas; and a second reflector electrically isolated from the second resonator and positioned adjacent to at least one of the third and fourth antennas, and wherein a longitudinal axis of the second reflector intersects the second coupling element wherein the antenna apparatus is configured as a passive repeater antenna; and wherein a plane of the electromagnetically reflective layer extends parallel to an entire plane of the first arrangement of conductors.

21. The antenna apparatus of claim 20, wherein at least one of the first and second antennas is one of a dipole antenna, a rhombic antenna, a planar antenna, and a yagi antenna.

22. The antenna apparatus of claim 20, wherein the first and second antennas are folded dipole antennas, and the respective feed point for each of the first and second antennas comprises first and second feed terminals, and wherein the coupling element includes first and second conductive traces, the first conductive trace electrically connecting the respective first feed terminals of the first and second antennas, and the second conductive trace electrically connecting the respective second feed terminals of the first and second antennas;

wherein the first arrangement of conductors further comprises at least one director in parallel with the first reflector, and wherein one of the first and second antennas is positioned between the at least one director and the first reflector.

23. The antenna apparatus of claim 20, further comprising:

a conductive via extending through the first dielectric layer, the electromagnetically reflective layer and the second dielectric layer, the conductive via electrically connecting the first and second coupling elements; and a dielectric separator interposed between the electromagnetically reflective layer and the via electrically isolating the electromagnetically reflective layer and the via.

* * * * *